United States Patent [19]

Kraemer

[11] Patent Number: 4,585,383
[45] Date of Patent: Apr. 29, 1986

[54] BLIND RIVET

[76] Inventor: Ludwig Kraemer, Sudetenstrasse 23, D-8761 Mönchberg, Fed. Rep. of Germany

[21] Appl. No.: 657,035

[22] Filed: Oct. 1, 1984

Related U.S. Application Data

[63] Continuation of Ser. No. 570,411, Jan. 12, 1984, abandoned, which is a continuation of Ser. No. 465,420, Feb. 10, 1983, abandoned, which is a continuation of Ser. No. 154,687, May 30, 1980, abandoned.

[30] Foreign Application Priority Data

Jun. 7, 1979 [DE] Fed. Rep. of Germany ....... 2923171
May 13, 1980 [DE] Fed. Rep. of Germany ....... 3018286

[51] Int. Cl.$^4$ .............................................. F16B 13/06
[52] U.S. Cl. ...................... 411/38; 411/43; 411/70
[58] Field of Search ............... 411/34, 35, 36, 37, 411/38, 39, 40, 43, 70

[56] References Cited

U.S. PATENT DOCUMENTS

| | | | |
|---|---|---|---|
| Re. 20,055 | 8/1936 | Huck | 411/43 X |
| 2,030,167 | 2/1936 | Miller . | |
| 2,030,169 | 2/1936 | Huck | 411/34 |
| 2,562,019 | 7/1951 | Colley | 411/38 |
| 2,756,624 | 7/1956 | Austin | 411/43 |
| 3,055,255 | 9/1962 | Burrell . | |
| 3,181,413 | 5/1965 | Wing | 411/34 |
| 3,257,890 | 6/1966 | Kraemer | 411/43 |
| 3,286,580 | 11/1966 | Jeal . | |
| 3,414,965 | 10/1968 | Stau . | |
| 3,426,375 | 2/1969 | Jeal | 411/43 X |
| 3,750,525 | 8/1973 | Waters et al. | 411/34 |
| 3,880,042 | 4/1975 | Binns | 411/43 |
| 4,036,098 | 7/1977 | Schruff | 411/34 |
| 4,168,650 | 9/1979 | Dahl et al. | 411/43 |
| 4,189,977 | 2/1980 | Hintz et al. | 411/34 |
| 4,203,346 | 5/1980 | Hall et al. | 411/34 |
| 4,211,145 | 7/1980 | Dolch | 411/43 |
| 4,236,429 | 12/1980 | Dolch | 411/43 X |

FOREIGN PATENT DOCUMENTS

| | | | |
|---|---|---|---|
| 119997 | 6/1945 | Australia | 411/43 |
| 1099276 | 2/1961 | Fed. Rep. of Germany . | |
| 1889643 | 3/1964 | Fed. Rep. of Germany . | |
| 1813276 | 7/1969 | Fed. Rep. of Germany . | |
| 7144351 | 11/1971 | Fed. Rep. of Germany . | |
| 1546777 | 10/1968 | France . | |
| 1595298 | 7/1970 | France . | |
| 252413 | 10/1948 | Switzerland | 411/43 |
| 613882 | 12/1948 | United Kingdom . | |
| 738760 | 10/1956 | United Kingdom . | |
| 860123 | 2/1961 | United Kingdom . | |
| 891460 | 3/1962 | United Kingdom | 411/38 |
| 949003 | 2/1964 | United Kingdom | 411/43 |
| 1413592 | 11/1975 | United Kingdom . | |

*Primary Examiner*—Thomas J. Holko
*Attorney, Agent, or Firm*—Flynn, Thiel, Boutell & Tanis

[57] ABSTRACT

A blind rivet includes a body having a shank, a head and a bore therethrough and includes a drawing mandrel having a shank receivable in the bore in the body and having a head at one end of the shank, the maximum diameter of the head being substantially equal to the outside diameter of the body shank. The body shank has, at a location spaced from the free end of the shank, a section of reduced wall thickness defined by a step increase in the diameter of the bore. A plurality of spaced planar bevel surfaces are preferably provided on the head of the drawing mandrel and are inclined inwardly toward the top thereof. In one embodiment, the portion of the bore on the side of the step remote from the free end of the body shank preferably widens conically toward the head of the body.

17 Claims, 6 Drawing Figures

BLIND RIVET

This application is a continuation of U.S. Ser. No. 570 411, filed Jan. 12, 1984, which is a continuation of U.S. Ser. No. 465 420, filed Feb. 10, 1983, which is a continuation of U.S. Ser. No. 154 687, filed May 30, 1980, all now abandoned.

FIELD OF THE INVENTION

The invention relates to a blind rivet as described in the and, more particularly, to a blind rivet for use with grips of different thicknesses which includes a body with a head, a shank, a bore therethrough, and a section of reduced wall thickness at a location spaced from the free end of the shank, and includes a drawing mandrel having a shank receivable in the body bore and having a head at one end of the shank which has a maximum diameter substantially corresponding to the outside diameter of the body shank.

BACKGROUND OF THE INVENTION

A blind rivet of this kind can be used not only for the grips which normally correspond to its shank length but also for smaller gripping thicknesses. The head of the drawing mandrel upsets the shank during the riveting operation, during which process the shank zone which projects from the parts to be connected and has a reduced wall thickness is deflected and forms a collar-shaped bead between the material surface and the closing head. Due to their wide range of use, blind rivets of this kind make unnecessary the production, acquisition and maintenance of stocks of a large selection of blind rivet sizes for all the gripping thicknesses which are required. Also, the risk of any confusion of the sizes occurring is considerably reduced.

A blind rivet of this kind which is known from obvious prior use consists of aluminium. Its shank has, approximately in the centre of its length, a zone of a reduced outside diameter and thus a reduced wall thickness. During its production, the shank of the blind rivet is pressed in its central zone between gripping dies. During this process, the aluminium rivet material is deflected on both sides of the die into the ungripped shank zones. This known blind rivet thus necessitates an elaborate production. Above all, the described deformation can only be brought about in aluminium rivets. It is not possible in steel rivets.

There is furthermore known a blind rivet (DE AS 1 099 276) which has sections of varying wall thickness. In the shank, which is cylindrical on the outside, there extends a cylindrical bore from the set head to approximately two thirds of the shank length. The remainder of the shank bore tapers conically towards the free shank end, as a result of which the wall thickness is also conically increased in this section. The drawing mandrel for this blind rivet has a half-round head whose diameter on its underside is between the shank diameter and the minimum hold diameter of the rivet. The edge of the head forms a cupped gripping point which is directed towards the shank end of the rivet. The drawing mandrel portion that directly adjoins the head is formed as a cone which increases away from the head. For the production of the riveted connection, this known rivet is deformed in two stages: At the start of the riveting operation, the conical zone of the drawing mandrel shank is outside the rivet shank bore. As soon as the thick end of this section is pulled into the rivet bore, it expands the section having the conical rivet shank bore in that it presses the shank wall to the outside in this section. When the head of the drawing mandrel comes into abutting contact with the rivet shank, the rivet shank has a bore which continues cylindrically at the same diameter and a section which conically widens on the outside towards the free rivet shank end. The second deformation is substantially effected in that the head of the drawing mandrel divides, with its cupped gripping point, the free shank end of the rivet shank into an external zone and an internal zone; the external zone, which is not covered by the drawing mandrel head, being pressed outwardly during this further pull-through for the closing head formation. The internal zone is pressed by the drawing mandrel head into the hollow space which is provided between the conical drawing mandrel section and the shank bore of the rivet. As the drawing mandrel is pulled through, the external zone of the rivet shank end flows around the head of the latter and largely envelops it. Following the breaking-away of the drawing mandrel at a predetermined breaking point, which is close to the thick end of the conical shank section that is close to the head, there comes about a largely tight riveted connection with a fixed drawing mandrel head and head shank. This known blind rivet has nothing in common with the species of the subject matter of the application since it is not intended for grips of varying thickness and the design of the drawing mandrel is different. The ratio of the drawing mandrel head diameter to the diameter of the rivet shank is in the case of the known blind rivet essential for the solution to the problem formulated in connection with this rivet, which solution is achieved by the described deformation of the blind rivet shank. An upsetting effect which with smaller gripping thicknesses might lead to the formation of the collar-shaped bead required therefor cannot be brought about in the case of the known blind rivet during the riveting operation.

Furthermore known is a blind rivet with sections of varying wall thickness (CB PS 860 123), wherein the shank bore has at the free shank end a section of reduced diameter and the shank has in this zone an outside diameter which conically increases towards the free end. This blind rivet is set by means of a pull-through mandrel which does not stay in the riveted joint. The pull-through mandrel has a shank with a conically widened end. As it passes through the rivet shank bore, the conical end of the pull-through mandrel presses the entire projecting zone of the blind rivet shank to the outside and, due to the external conical shape of this zone, brings it into gripping contact with the material to be connected. After the pull-through of the entire mandrel, the riveted connection has a bore of a continuous identical inside diameter. The pull-through mandrel of this configuration cannot exercise any upsetting effect at all. A hollow rivet connection only comes about if the shank length and the shank shape are exactly adapted to the intended gripping thickness. Should a closed riveted connection be desired, then a cylindrical pin has to be driven into the hollow rivet by hand. For the mentioned reasons, this rivet is not suitable for varying grips.

It is the object of the invention to provide a blind rivet of the above-mentioned type which can be easily produced from any material, especially steel, and which can nevertheless be used for a wide gripping range.

SUMMARY OF THE INVENTION

According to the invention, this problem is solved by providing a rivet of the above-mentioned type wherein the section of reduced wall thickness is formed by a step increase in the diameter of the bore in the body shank.

During the setting of the blind rivet according to the invention, the projecting shank zone is deformed by upsetting. The head of the drawing mandrel, which covers the entire free end surface of the blind rivet shank, exerts this effect, which leads to the formation of the closing head when used in the grip that corresponds to the shank length and results in a bead formation in a smaller grip. Compared to the aluminium rivet described at the beginning, there is provided, in addition to the possibility of using any desired rivet material and a simpler production, the further advantage that the outside shank diameter can remain the same throughout. In the case of rivets used in the maximum gripping range, the shank thus bears everywhere uniformly against the wall of the rivet hole. In the smaller gripping range, the radial movement of the material already starts on the outside diameter of the rivet during the upsetting of the rivet, whereas in the case of the known aluminium rivet the first portion of the radial path serves for first reaching the normal shank outside diameter and thus the diameter of the rivet bore. The stepped transition of the diameter increase results in the material which advances faster in the zone of the step urging the zone having the larger bore diameter to the outside and thus determining the direction of bulging. As the upsetting process progresses, the head of the drawing mandrel then gradually penetrates between the bulged-out shank walls. The afore-described blind rivets with differences in diameter in the shank bore are deformed by the expanding of the bore and not by upsetting during the riveting operation and are not usable for varying gripping thicknesses and thus cannot contribute to the solution of the problems with which the invention is concerned.

Advantageously, the bore section having a reduced wall thickness has a bore diameter which somewhat exceeds the diameter of the drawing mandrel. In this zone, it is possible for rivet material to penetrate during the penetration of the drawing mandrel head into the upset shank zone.

In a preferred constructional form, the underside of the drawing mandrel head is flat and thus bears with its entire surface against the end of the blind rivet shank.

In another constructional form, the underside of the drawing mandrel head may be bevelled so as to rise from its external edge zone towards the drawing mandrel shank. In this form, too, there comes about the axial upsetting effect which is material to the invention.

The actions of the longitudinal bore on both sides of the step may extend cylindically and thus be produceable by simple drilling.

In another constructional form, the longitudinal bore widens conically from the step to the opening in the set head. The wall thicknesses are thus the thinner the smaller the gripping thickness is, so that the minimum wall thickness of the shank portion that projects from the grip is directly above the contact face of the collar-shaped bead that is being formed. Good bulging and thus reliable overlapping and contact-making are ensured in this way.

An advantageous further development of the blind rivet according to the invention consists in that the drawing mandrel has an approximately spherical-cap-shaped head with at least three plane-surface bevels which extend so as to be inwardly inclined to the top. Due to the bevels, the head of the drawing mandrel is pulled particularly easily into the deforming rivet shank and is satisfactorily overlapped and held by the rivet material. A firm grip of the drawing mandrel head can thus be brought about even when hollow steel rivets are used.

In a preferred constructional form, the bevels may extend as far as the lower head surface in such a way that the circumference thereof runs in a straight line in the zone of each bevel. The head has a contour which, depending on the number of bevels, is reminiscent of a triangle or polygon. This results in a particularly effective overlapping of the rivet shank material.

BRIEF DESCRIPTION OF THE DRAWINGS

Some exemplified embodiments of the invention will be described with reference to the accompanying drawings, in which.

DETAILED DESCRIPTION

Figure 1:
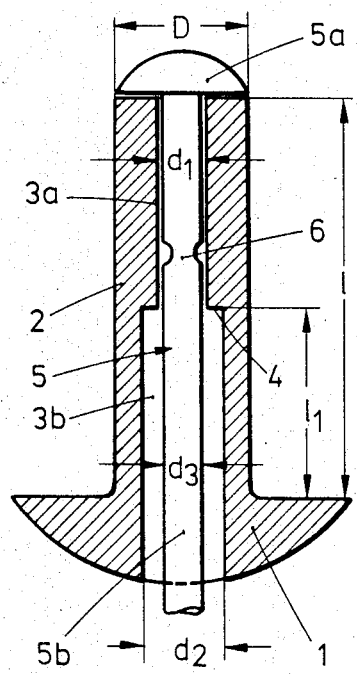
FIG. 1 shows a blind rivet, including the drawing mandrel, in a section.

The blind rivet shown in FIG. 1 has a spherical-cap-shaped set head 1 and a shank 2. A longitudinal bore, which is designated 3 as a whole, extends through the entire blind rivet. It is composed of a cylindrical section 3a having a diameter $d_1$ and a cylindrical section 3b having a diameter $d_2$; the diameter $d_2$ being a few tenths of a millimeter larger than the diameter $d_1$. The section 3a extends from the end of the shank 2 that is remote from the head to approximately mid-way of the shank length 1, and the section 3b extends subsequently to the surface of the set head 1. The transition from the section 3a to the section 3b occurs abruptly along with the formation of a step 4. More specifically, as shown in FIG. 1, the transition 4 is a steplike increase in the bore diameter which defines a generally axially facing shoulder 4a, the radially inner and outer edges of the shoulder 4a being defined by sharp, distinct corners 4b and 4c.

The rivet shown preferably consists of steel. The dimensions given hereunder are meant to give an approximate picture of the measurement conditions:

| | | |
|---|---|---|
| Shaft length | l | 12 mm |
| Shaft outside diameter | D | 4.75 mm |
| Length of section 3a | $l_1$ | 6 mm |
| Bore diameter of section 3a | $d_1$ | 2.8 mm |
| Bore diameter of section 3b | $d_2$ | 3.5 mm |
| Possible gripping thicknesses | s | from 1 to 8 mm |

A drawing mandrel, which is designated 5 as a whole, is inserted in the blind rivet. it has an approximately spherical-cap-shaped head 5a with a flat underside or bottom surface which directly contacts the end surface of the shank 2. The diameter of the bottom surface thereof is approximately equal to the diameter D of the shank outside diameter. The drawing mandrel shank has a diameter $d_3$ which differs from the daimeter $d_1$ of the smaller shank bore only to such an extent that the drawing mandrel is introduceable into the blind rivet shank without difficulty. The drawing mandrel shank 5b has a predetermined breaking point 6.

Figure 2:
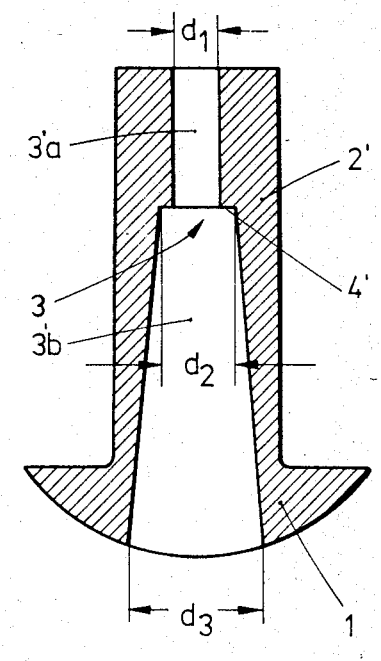
FIG. 2 shows a different constructional form of a blind rivet without a drawing mandrel in a section.

FIG. 2 shows a longitudinal section through another constructional form of a blind rivet with a set head 1', a shank 2' and longitudinal bore 3'. The longitudinal bore 3' comprises a cylindrical section 3a' which extends with a diameter $d_1$ from the shank end that is remote from the head to approximately the longitudinal centre thereof. There follows, along with the formation of a step 4', a section 3b' with a diameter $d_2$ which widens conically from the step 4' to the surface of the set head 1' up to an opening diameter $d_3$. The rivet shown in FIG. 2 also consists of steel.

Figure 3:
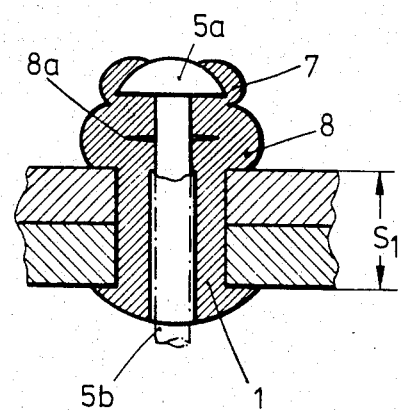
FIG. 3 shows a riveted connection in a longitudinal section.
Figure 4:
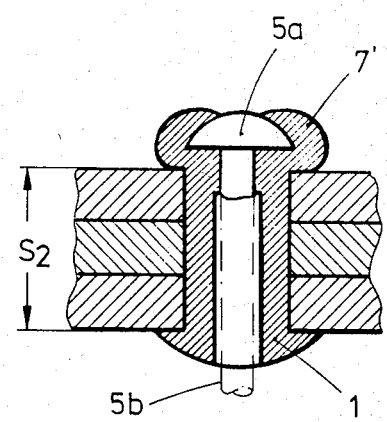
FIG. 4 shows another riveted connection in a longitudinal section.

FIGS. 3 and 4 show in longitudinal sections a riveted joint produced with a blind rivet shown in FIG. 1 with grips of different thickness.

FIG. 3 is the example for a minimal gripping thickness $s_1$; FIG. 4 is the sample for a larger gripping thickness $s_2$. The formation of the closing head 7 is effected by using the drawing mandrel 5, including the drawing mandrel head 5a, the shank 5b breaking at the predetermined breaking point 6.

In the case of a riveted joint with the minimal gripping thickness $s_1$, the shank of the multi-range rivet shown in FIG. 1 projects farther from the rivet bore than is necessary for the formation of a closing head. As soon as the upsetting operation commences through the pull on the drawing mandrel 5, the shank zone with the bore section 3b, in other words with the smaller wall thickness, is deflected to the outside. The subsequently forming closing head 7 and the head 5a of the drawing mandrel 5 which penetrates deeper into the bore presses the bulging shank zone as a collar-shaped bead 8 on the surface of the material to be riveted and thus brings about the firm fit of the rivet. FIG. 3 shows the completed connection after the breaking-away of the drawing mandrel shank 5b. The "folding" of the shank material in the zone of the bead 8 is indicated at 8a.

FIG. 4 shows a riveted connection wherein the grip has the maximum thickness $s_2$ that corresponds to the shank length 1. The rivet shank zone of reduced wall thickness, in other words the entire bore section 3b of increased diameter, is located within the rivet bore. During the riveting operation, there has formed a normal closing head 7'. Within the scope of the play between the shank diameter and the rivet bore, the zone with the reduced wall thickness has come into particularly good abutting contact with the wall of the rivet hole, due to the slight concavity.

Figure 5:
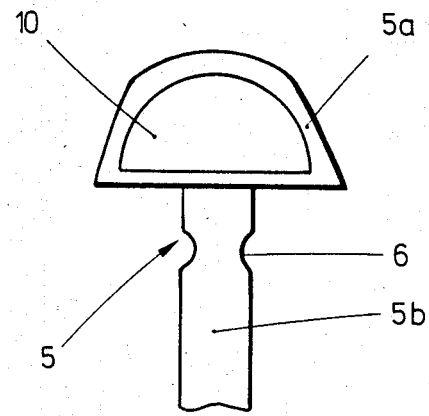
FIG. 5 shows an elevation of a drawing mandrel.
Figure 6:
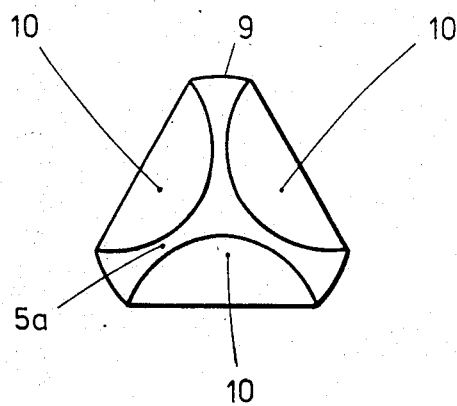
FIG. 6 shows a top view of the drawing mandrel.

The drawing mandrels 5 shown in FIGS. 5 and 6 each have three bevels 10 at their heads 5a. In the case of the drawing mandrel shown in FIG. 5, the bevels extend over the underside of the head 5a that is directed towards the shank so as to be inclined inwardly towards the surface of the head. In the case of the head shown in FIG. 6 in a top view, the bevels 10 extend as far as the lower head surface in such a way that the surface equals a circular surface having cut-off segments, that is to say the circumference extends in a straight line in the zone of each bevel. As the drawing mandrel head penetrates into the rivet bore, the bevels make it possible for the rivet material to overlap the head in the zone of the bevels in a particularly effective manner and thus reliably to hold the head.

As shown in broken lines in FIG. 1, the underside of the drawing mandrel head may be beveled slightly.

The invention is not confined to the exemplified embodiments shown. For example, the longitudinal bore of the shank may have three sections having different diameters which increase towards the set head. Furthermore, the transition may occur in the form of a short bevel instead of a radial step. Depending on the hollow rivet material used, the length of the bore sections may vary. Of course, the set head, too, may differ in shape, as required. The same applies to the head of the drawing mandrel. Its base surface need not be flat but may extend inwardly in a roof-like manner. Its external edge need not form a circular surface, even without bevels, but may, for example, be a polygon. What is essential is that the largest diameters of the lower edge should correspond to the outside diameter of the rivet shank so as to ensure that the drawing mandrel head brings about an axial upsetting effect during the riveting operation. If necessary, the outside diameter of the drawing mandrel head may be somewhat larger than the outside diamter of the rivet shank. A very minimal undersize is also conceivable.

The embodiments of the invention in which an exclusive property or privilege is claimed are defined as follows:

1. In a blind rivet assembly having a grip thickness within a range bounded by minimum and maximum thickness values for use in gripping at least two sheet-like layers, said rivet assembly including a blind rivet having a mandrel associated, therewith, the improvement comprising:

said blind rivet being an integral one-piece body having an elongated shank which is free at one end and is provided with an enlarged head at the other end, said shank at the free end thereof defining thereon an end surface, said shank having a smooth and substantially cylindrical outer surface of substantially uniform diameter throughout the axial extent thereof;

said mandrel having an elongated stem which projects through the rivet body and has an enlargement at one end thereof, said enlargement having a substantially flat bottom surface for abutting contact with said end surface of said shank, said enlargement having a maximum cross-sectional dimension which is defined by said bottom surface and is approximately equal to the diameter of said shank, and the bottom surface of said enlargement having an outer edge which directly contacts said end surface;

said shank having means associated therewith in the vicinity of the free end thereof for permitting deformation of the shank to create a substantially annular upset portion which at least partially surrounds said enlargement in response to said enlargement and said head being axially moved toward one another for effecting compression of said shank therebetween;

said shank also having means associated therewith which is positioned more closely adjacent said head for radially outwardly deforming said shank at a location intermediate the ends thereof to create a substantially annular radially outwardly projecting bead which is created adjacent the rearward side of the layers only when the grip thickness of the layers equals or slightly exceeds the minimum grip thickness, said last-mentioned means being incapable of forming said bead when the thickness of the layers is equal to or only slightly less than the maximum grip thickness;

said shank when in an initial nondeformed condition having a first substantially cylindrical bore formed coaxially over a substantial axial extend thereof, said first bore extending inwardly from the free end of said shank and having a smooth substantially cylindrical wall which is of substantially uniform diameter;

said shank having a second axially elongated bore formed therein and extending over a substantial axial extent thereof, said second elongated bore extending axially of said rivet body through the head and axially into and partially through the shank for communication with said first bore, said second bore being of larger diameter than said first bore, said shank at the axial intersection between said first and second bores defining thereon an annular shoulder which surrounds said first bore and projects substantially radially outwardly therefrom, said shoulder facing axially toward said head and being at a location which is spaced axially from the underside of the head by a distance which is greater than said minimum grip thickness, whereby said first and second bores each extend over a substantial axial length of said rivet body with said first and second bores together extending over the complete axial length of said rivet body; and said stem of said mandrel having an outer diameter over its length which closely equals the diameter of said first bore so that the stem can be freely axially moved into and through said first and second bores, said stem at a location which is disposed within said shank being provided with a reduced cross section to facilitate breaking of said stem in response to a substantially predetermined tension force being imposed on the stem during deformation of the rivet body.

2. An assembly according to claim 1, wherein each of said first and second bores are of uniform diameter throughout their respective axial lengths.

3. An assembly according to claim 1, wherein said second bore as it extends from said head to said shoulder extends over an axial length which is at least about one-half of the axial length of said rivet body.

4. An assembly according to claim 1, wherein the enlargement of said mandrel is of a substantially hemispherical configuration so that the maximum cross-sectional dimension of the mandrel enlargement is defined by said bottom surface, the material of the rivet flowing upwardly over and inwardly of the outer edge of said enlargement to create said annular upset portion in surrounding relationship to said enlargement.

5. A rivet assembly according to claim 4, wherein said flat bottom surface abuttingly contacts the end surface of said shank over substantially the entirety of said end surface.

6. A rivet assembly having a grip thickness variable within a rather wide dimensional range as defined by minimum and maximum thickness values for use in gripping a workpiece, said rivet assembly comprising:
a drawing mandrel having an elongate substantially cylindrically mandrel shank and having at one end of said mandrel shank a mandrel head which has a diameter greater than the diameter of said mandrel shank, said mandrel having means for causing said mandrel shank to break at a predetermined location when an axial tension force which is greater than a first predetermined value is applied to said mandrel shank;

a rivet body having an elongate body shank which has a smooth cylindrical outer surface and having at one end of said body shank a body head which has a diameter greater than the diameter of said body shank, said rivet body having therein a bore of circular cross-section which extends coaxially through said body shank and said body head, said bore slidably receiving said mandrel shank therein, and an end of said body shank remote from said body head defining thereon an end surface which is directly abuttingly engaged by a bottom surface of said mandrel head;

means associated with said shank and said mandrel head, responsive to an axial compressive force, for (1) causing said body shank at the remote end thereof to bulge radially outwwrdly to produce an annular upset which at least partially externally surrounds said mandrel head whenever the grip thickness of the workpiece equals or falls between said minimum and maximum thickness values, and (2) causing said shank at a location disposed axially between said annular upset and said workpiece to bulge radially outwardly to produce an annular bead directly adjacent the workpiece only when the workpiece has a grip thickness equal to or only slightly greater than said minimum thickness value, said means being incapable of forming said annular bead when the workpiece grip thickness equals or is only slightly less than said maximum thickness value;

said means including a first portion of said bore which is of substantial axial extent and which extends axially of said body shank from said end surface to an abrupt and substantially radially extending annular shoulder, said shoulder being spaced axially from said body head a distance substantially greater than said minimum thickness value and substantially less than said maximum thickness value, said first portion of said bore being substantially cylindrical and having a diameter substantially equal to the diameter of said mandrel shank whereby said body shank in the portion thereof containing said first bore portion is of a thick wall;

said means including a second portion of said bore which is also of substantial axial extent and which extends axially from said shoulder to and through said body head, said second portion of said bore having a diameter greater than that of said mandrel shank whereby the body shank in that portion contaning the second bore portion is of a thin wall;

said means including the bottom surface on said mandrel head having a maximum diameter which is approximately equal to the diameter of said shank as defined at said end surface, the mandrel head having a maximum cross section which decreases as the head projects upwardly away from the bottom surface, and said bottom surface having an outer edge which directly contacts said end surface.

7. The rivet according to claim 6, wherein said second portion of said bore is substantially cylindrical.

8. The rivet according to claim 6, wherein said second portion of said bore is substantially frustoconical and progressively increases in diameter from said annular shoulder through said body head.

9. The rivet according to claim 6, wherein radially inner and outer edges of said annular shoulder each have a sharp corner.

10. The rivet according to claim 6, wherein said annular shoulder is substantially perpendicular to an axis of said bore through said body.

11. The rivet according to claim 6, wherein said annular shoulder extends radially outwardly at a relatively large angle with respect to an axis of said bore through said body.

12. The rivet according to claim 6, wherein the distance between the bottom surface of said body head and said annular shoulder is at least approximately half the length of said body shank.

13. The rivet according to claim 6, wherein said bottom surface of said mandrel head is beveled to face slightly toward said drawing mandrel shank.

14. The rivet according to claim 6, wherein said mandrel head is generaly hemispherical in shape.

15. The rivet according to claim 6, wherein said mandrel head is generally hemispherical in shape and has at least three planar surfaces at angularly spaced locations thereon which converge in a direction away from said mandrel shank.

16. The rivet according to claim 15, wherein said planar surfaces extend to said bottom surface of said mandrel head, the perimeter of said underside being a straight line in the region of each said planar surface.

17. A blind rivet for use in a workpiece having a grip thickness which is within a range bounded by minimum and a maximum thickness, comprising:
   a body which has a head, a shank and a longitudinal bore therethrough, the shank at its free end terminating in transverse end surface;
   a drawing mandrel having a shank slidably received in said bore in said body and having a head at one end of said shank, said head having a bottom surface disposed in opposed facing relation to said end surface;
   said body shank having an exterior surface which is smooth and has a constant outside diameter along the length thereof;
   the maximum diameter of the bottom surface of said drawing mandrel head substantially corresponding to said outside diameter of said body shank, and said end surface of said body shank being engaged by at least the outer edge of the bottom surface of said drawing mandrel head;
   said bore through said body shank having an annular shoulder defining a diameter increase at a location spaced from the underside of said head of said body by a distance which is greater than said minimum grip thickness and less than said maximum grip thickness, thereby dividing said body shank into a thin walled portion and a thick walled portion, the diameter of the portion of said bore extending from said diameter increase toward said mandrel head being substantially equal to the diameter of said mandrel shank, and the diameter of the portion of said bore extending from said diameter increase toward said body head being substantially greater than the diameter of said mandrel shank;
   said body shank having means for causing said thick walled portion thereof between said mandrel head and said diameter increase to bulge radially outwardly in response to an axial compressive force caused by moving said heads axially toward one another so as to produce an annular upset around the mandrel head when at least part of said thick walled portion extends axially outwardly of the grip thickness of the workpiece; and
   said body shank having means for causing said thin walled portion thereof between said head of said body and said diameter increase to bulge radially outwardly in response to said axial compressive force so as to produce an annular bead between the upset and th workpiece only when said thin walled portion protrudes substantially axially outwardly of the workpiece due to said grip thickness being equal to or only slightly greater than said minimum grip thickness, said annular bead being substantially completely formed prior to any substantial forming of said annular upset, and said last-mentioned means being incapable of forming said bead when said grip thickness is equal to or only slightly less than the maximum grip thickness.

* * * * *

UNITED STATES PATENT AND TRADEMARK OFFICE
CERTIFICATE OF CORRECTION

PATENT NO. : 4 585 383
DATED : April 29, 1986
INVENTOR(S) : Ludwig KRAEMER

It is certified that error appears in the above-identified patent and that said Letters Patent is hereby corrected as shown below:

Column 6, line 34; after "associated" delete the comma.

Column 7, line 9; change "extend" to ---extent---.

Column 7, line 67; change "cylindrically" to ---cylindrical---.

Column 9, line 42; after "in" insert ---a---.

Column 10, line 38; change "th" to ---the---.

Signed and Sealed this

Sixteenth Day of September 1986

[SEAL]

Attest:

DONALD J. QUIGG

Attesting Officer    Commissioner of Patents and Trademarks